US011216564B1

(12) United States Patent
Bush, Jr. et al.

(10) Patent No.: US 11,216,564 B1
(45) Date of Patent: *Jan. 4, 2022

(54) DATA MOVEMENT PERIMETER MONITORING

(71) Applicant: State Farm Mutual Automobile Insurance Company, Bloomington, IL (US)

(72) Inventors: Richard J. Bush, Jr., Shirley, IL (US); Zebediah R. Black, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/863,618

(22) Filed: Apr. 30, 2020

Related U.S. Application Data

(63) Continuation of application No. 15/243,390, filed on Aug. 22, 2016, now Pat. No. 10,678,928.

(60) Provisional application No. 62/325,132, filed on Apr. 20, 2016, provisional application No. 62/345,981, filed on Jun. 6, 2016, provisional application No. 62/348,246, filed on Jun. 10, 2016.

(51) Int. Cl.
*G06F 21/57* (2013.01)
*G06F 16/16* (2019.01)
*G06F 21/55* (2013.01)
*H04L 29/06* (2006.01)

(52) U.S. Cl.
CPC ......... *G06F 21/577* (2013.01); *G06F 16/166* (2019.01); *G06F 21/55* (2013.01); *G06F 2221/034* (2013.01); *H04L 63/145* (2013.01)

(58) Field of Classification Search
CPC . H04L 63/1425; H04L 63/145; G06F 21/577; G06F 16/166; G06F 21/55; G06F 2221/034
USPC .......................................................... 726/22
See application file for complete search history.

(56) References Cited

U.S. PATENT DOCUMENTS 5,557,742 A  9/1996 Smaha et al.
6,769,066 B1  7/2004 Botros et al.
(Continued)

OTHER PUBLICATIONS

LogTree: A Famework for Generating System Events from Raw Textual Logs—IEEE—Published May 1, 2010.*

*Primary Examiner* — Bryan F Wright

(57) ABSTRACT

A system and method is provided for improving data movement perimeter monitoring, and detecting non-compliant data movement within a computing environment. The perimeter monitoring process includes generating a forwarding configuration associated with activity logs, such as activity logs associated with a test environment. The forwarding configuration may include specific fields and file types or the contents of those specific fields and files that facilitate, or are necessary for, perimeter monitoring or otherwise determining which activity log data elements are needed by the "operational intel tool" to reduce, or even substantially reduce, the amount of data input or analyzed by the operational intel tool, and thus, to reduce its processing load. The forwarding configuration is input into an "operational intel tool". Mainframe data is normalized and analyzed to identify abnormal data flows and generate electronic alerts to facilitate perimeter monitoring. False positives may be identified before the alerts are communicated.

20 Claims, 7 Drawing Sheets

(56) References Cited

U.S. PATENT DOCUMENTS

| | | | |
|---|---|---|---|
| 7,930,746 B1 * | 4/2011 | Sheleheda | H04L 63/1425 726/23 |
| 2003/0188189 A1 | 10/2003 | Desai et al. | |
| 2006/0041464 A1 | 2/2006 | Powers et al. | |
| 2006/0259967 A1 | 11/2006 | Thomas et al. | |
| 2007/0073519 A1 | 3/2007 | Long | |
| 2007/0174214 A1 | 7/2007 | Welsh et al. | |
| 2011/0106680 A1 | 5/2011 | Vittal et al. | |
| 2012/0254313 A1 | 10/2012 | Fake et al. | |
| 2015/0127670 A1 | 5/2015 | Torman et al. | |
| 2015/0347233 A1 * | 12/2015 | Eckert | G06F 11/3072 707/650 |
| 2017/0249200 A1 | 8/2017 | Mustafi et al. | |

* cited by examiner

DATA MOVEMENT PERIMETER MONITORING

RELATED APPLICATIONS

The present U.S. non-provisional patent application is a continuation of U.S. patent application Ser. No. 15/243,390, titled "Data Movement Perimeter Monitoring", filed Aug. 22, 2016, which is related to and claims priority benefit of a first earlier-filed U.S. provisional patent application titled "'Perimeter Monitoring", Ser. No. 62/325,132, filed Apr. 20, 2016, and of a second earlier-filed U.S. provisional patent application titled "Data Movement Perimeter Monitoring", Ser. No. 62/345,981, filed Jun. 6, 2016, and of a third earlier-filed U.S. provisional patent application titled "Data Movement Perimeter Monitoring", Ser. No. 62/348,246, filed Jun. 10, 2016. The entire contents of the identified earlier-filed applications are hereby incorporated by reference into the present application as if fully set forth herein.

FIELD OF THE DISCLOSURE

The present disclosure generally relates to monitoring data movement, and more particularly, to systems and methods that identify non-compliant data movement and generate alerts and/or corrective actions.

BACKGROUND

Perimeter monitoring, or data traffic monitoring, is the process of monitoring data movement into and out of different environments for the purpose of detecting movement that presents a potential risk to the organization. The process of perimeter monitoring is facilitated by several control schemes, including directive controls, preventative controls, and detective controls. Directive controls are standards, policies, and processes that define how data should be captured, scrubbed, and provisioned. Preventative controls aim to prevent sensitive information from entering test environments. Detective controls generate alerts when other controls fail and attempt to limit the impact, identify areas that need improvement, and collect evidence that the various controls are working. These controls help to protect systems, infrastructure, information, and brand, and when they are not followed, all of these aspects may be at risk.

Current methods for identifying non-compliant data movement are largely manual in nature, and involve manual discovery efforts that attempt to associate defined processes with actions taken. These methods typically do not use empirical data, such as activity logs, primarily because the information is difficult to properly correlate.

SUMMARY

The present embodiments may, inter alia, improve data movement perimeter monitoring, and detect non-compliant data movement within a computing environment. The present solution may provide users with key insights that enable them to better understand data movement. The solution may also generate real-time alerts when anomalies are detected. False positives may also be identified prior to alert generation.

In one aspect, a computer-implemented method for improving the functioning of a computer for data movement perimeter monitoring may be provided. The method may include: (1) generating, via one or more processors, a forwarding configuration associated with activity logs (such as activity logs associated with a test environment), the forwarding configuration including specific fields and file types that facilitate, or are necessary for, perimeter monitoring (or otherwise determining which activity log data elements are needed by an "operational intel tool" to reduce, or even substantially reduce, the amount of data input or analyzed by the operational intel tool, and thus reduce its processing load); (2) inputting, via the one or more processors, the forwarding configuration (including the specific fields and file types, or data therein, from the activity logs) into the "operational intel tool"; (3) normalizing, via the one or more processors, the mainframe data, the normalization may include assigning meaning to the information in the activity logs, creating specific groupings or classifications of data, and/or creation of new data that is easier to translate and correlate; and/or (4) analyzing, via the one or more processors, the normalized mainframe data to identify abnormal data flows and/or generate electronic alerts to facilitate perimeter monitoring. The method may include additional, fewer, or alternate actions, including those discussed elsewhere herein, and may be implemented via one or more processors and/or computer-executable instructions stored on non-transitory computer-readable medium or media.

In another aspect, a computer-implemented method for improving the functioning of a computer for data movement perimeter monitoring may be provided. The method may include (1) retrieving, via one or more processors, specific fields and/or file types (or data therein or contents thereof) from activity logs or other data, the specific fields and file types being identified as facilitating, or are necessary for, perimeter monitoring (or otherwise determining which activity log data elements are needed by the "operational intel tool" to reduce, or even substantially reduce, the amount of data input or analyzed by the operational intel tool (to reduce its processing load); (2) inputting, via the one or more processors, the specific fields and/or file types (or contents thereof) from the activity logs into an "operational intel tool"; (3) normalizing, via the one or more processors, the mainframe data, the normalization may include assigning meaning to the information in the activity logs, creating specific groupings or classifications of data, and/or creation of new data that is easier to translate and correlate; and/or (4) analyzing, via the one or more processors, the normalized mainframe data to determine how data is traversing a computing environment, and/or to identify potentially abnormal data flows and generate electronic alerts to facilitate perimeter monitoring. The method may include additional, fewer, or alternate actions, including those discussed elsewhere herein, and may be implemented via one or more processors and/or computer-executable instructions stored on non-transitory computer-readable medium or media.

In one aspect, a computer system configured for data movement perimeter monitoring may be provided. The computer system may include one or more processors configured to: (1) generate a forwarding configuration associated with activity logs (such as activity logs associated with a test environment), the forwarding configuration including specific fields and file types (or contents thereof) that facilitate, or are necessary for, perimeter monitoring (or otherwise determining which activity log data elements are needed by the "operational intel tool" to reduce, or even substantially reduce, the amount of data input or analyzed by the operational intel tool and to reduce its processing load); (2) input the forwarding configuration (including the specific fields and file types, and/or data therein, from the activity logs) into an "operational intel tool"; (3) normalize the mainframe data, the normalization may include assigning meaning to the information in the activity logs, creating specific groupings or classifications of data, and/or creation of new data that is easier to translate and correlate; and/or (4) analyze the normalized mainframe data to identify abnormal data flows and/or to generate electronic alerts to facilitate perimeter monitoring. The system may include additional, less, or alternate components and functionality, including that discussed elsewhere herein.

In another aspect, a computer-implemented method for improving the functioning of a computer for perimeter monitoring of data movement of data may be provided. The method may include the following performed by an electronic processor. A mainframe event log may be ingested into an operational intel tool in real-time to create raw data. The raw data may be normalized, including standardizing the raw data from different computing environments, to create normalized data. The normalized data may be filtered to remove unwanted noise and to identify a data movement anomaly. Whether the data movement anomaly meets an exception may be determined. Identification of the data movement anomaly may be visually communicated on an electronic display, and the identification of the data movement anomaly may be saved in an electronic memory. An electronic alert may be issued if the identified data movement anomaly does not meet the exception. The method may include additional, less, or alternate actions, including those discussed elsewhere herein.

In another aspect, a system for perimeter monitoring of data movement of data may be provided. The system may include an electronic memory element configured to store information, and an electronic processor configured to perform the following. A mainframe event log may be ingested into an operational intel tool in real-time to create raw data. The raw data may be normalized, including standardizing the raw data from different computing environments, to create normalized data. The normalized data may be filtered to remove unwanted noise and to identify a data movement anomaly. Whether the data movement anomaly meets an exception may be determined. Identification of the data movement anomaly may be visually communicated on an electronic display, and the identification of the data movement anomaly may be saved in an electronic memory. An electronic alert may be issued if the identified data movement anomaly does not meet the exception. The system may include additional, less, or alternate functionality, including that discussed elsewhere herein.

Various implementations of the foregoing aspects may include any one or more of the following features. Ingesting the mainframe event log to create the raw data may include identifying and retaining first data which is relevant to the perimeter monitoring of data movement, and identifying and discarding second data which is not relevant to the perimeter monitoring of data movement. Normalizing the raw data to create the normalized data may include standardizing different files names and different file formats from different computing environments, and may include standardizing data values provided by different computing environments. Filtering the normalized data may include searching the normalized data to identify and categorize data movement in order to identify the data movement anomaly. The data movement anomaly may be identified based on one or more of a source of the data, a destination of the data, a type of the data, an authorization of the source of the data, a time when the data was sent, and a program that sent the data. The exception may be based on one or more of a source of the data, a destination of the data, a type of the data, an authorization of the source of the data, a time when the data was sent, and a program that sent the data. The identification of the data movement anomaly may be visually communicated in the form of a dashboard report, and the dashboard report may include one or more of a source of the data, a destination of the data, a type of the data, an authorization of the source of the data, a time when the data was sent, and a program that sent the data. Identification of the data movement anomaly may be visually communicated in the form of a chart, and the chart may include one or more of a source of the data, a destination of the data, a type of the data, an authorization of the source of the data, a time when the data was sent, and a program that sent the data. The electronic alert may be saved in the electronic memory.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The present embodiments may relate to, inter alia, perimeter monitoring, and more specifically, to a real-time, automated control solution that actively monitors for non-compliant data movement and generates alerts, and thereby helps to reduce the impact of problems and reduce the cost of audits. With regard to reducing the impact of problems, by detecting non-compliant data movement embodiments can save organizations millions of dollars in losses to assets such as infrastructure and data, pace of delivery (avoiding stoppages of critical work and missed business opportunities), fines (which could be the millions of dollars), and damage to brand (which could cost tens of millions of dollars). With regard to reducing the cost of audits, embodiments provide automated detection and memorialization which demonstrate and provide evidence of efforts to protect sensitive information, which may reduce the duration of audits. Thus, embodiments provide users with key insights that enable them to better understand data movement.

Figure 1:
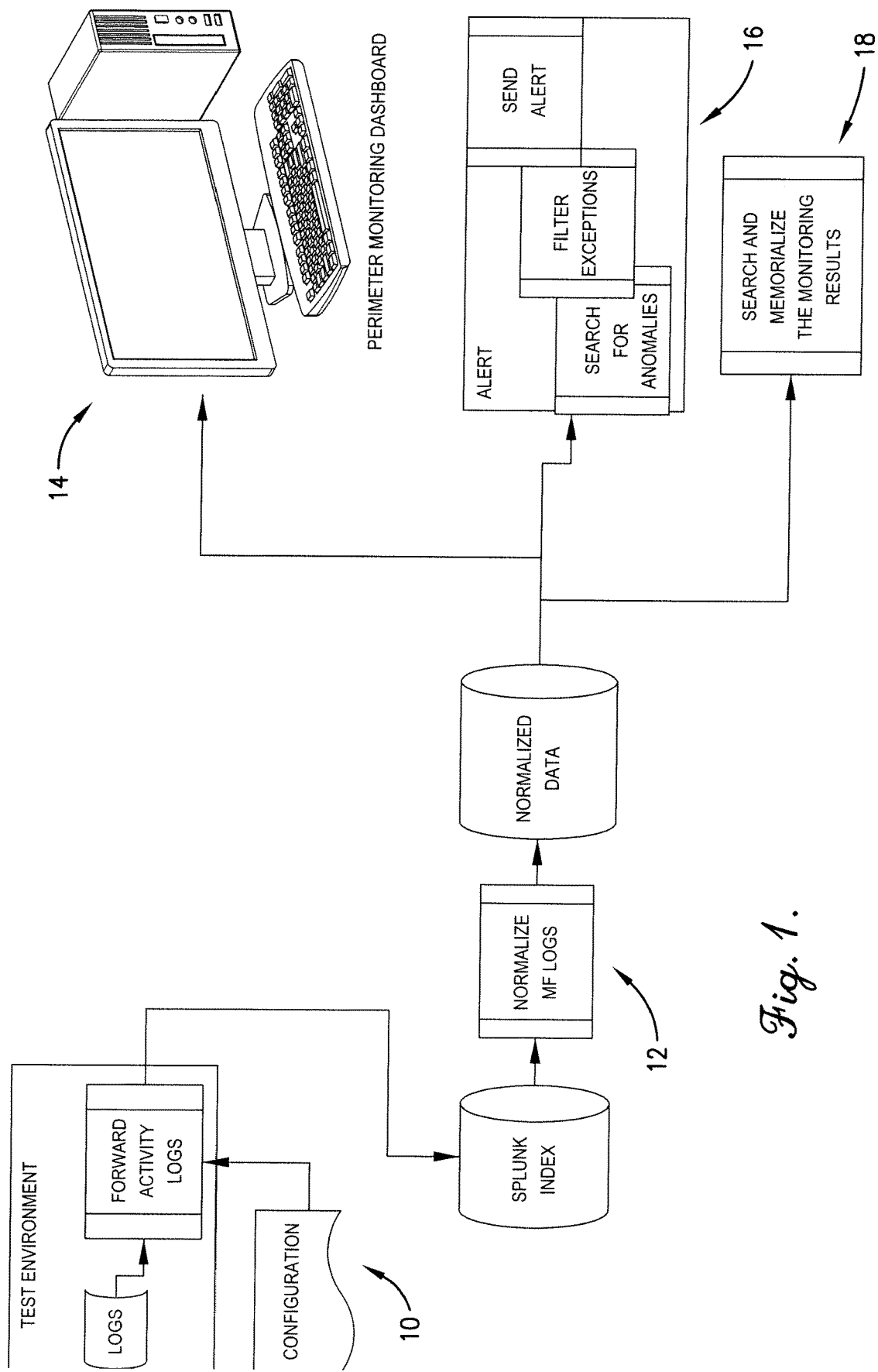
FIG. 1 depicts an exemplary computing environment configured for perimeter monitoring.

Referring to FIG. 1, the present embodiments may include several innovations: (1) configuration forwarding; (2) mainframe data normalization; (3) perimeter monitoring; (4) alert filtering; (5) automated memorialization; and/or (6) maturity processing. First, configuration forwarding may be provided, as shown in 10. While the actual forwarding software may be provided by a vendor, such as Syncsort, the configuration employed may be unique. For instance, specific fields and file types may be identified that are needed for perimeter monitoring, and may be used to uniquely configure the forwarding software.

Second, mainframe data may be normalized, as shown in 12. Normalizing the data may include categorizing or otherwise assigning meaning to information in data logs. This may entail specific grouping, categorizations, and sometimes the creation of new data based upon the information within the logs. This process may result in a completely new set of data that is easier to translate and correlate. The information may then be something that may be understood within one or more dashboards, such as a SPLUNK dashboard.

Third, perimeter monitoring may be performed, as shown in 14, such as via an Application ("App"). The app may be a SPLUNK app. The App may include or contain a specific set of dashboards that provide enhanced perspectives on how data is traversing the systems and/or within the computer environment, including communicating trends and risks related to patterns of data movement. The App may leverage the normalized data to provide insights that would otherwise be missed.

Fourth, alert filtering may be provided, as shown in 16. The App may contain alerting functionality. The App may also include a solution or method that filters out false alarms (or "false positives") or other movement that does not require or should not result in an alert. Any business may have exceptions that conditionally allow certain areas to "break the rules." These rules and exceptions tend to change often. The present solution may automatically import these exceptions and create a pattern for ingesting the complex exceptions and rules into the App without enduring the cost of changing the App.

Fifth, automated memorialization may be provided, as shown 18. Not only is monitoring for problems required, preferably there must be evidence generated that the monitoring is occurring. In the prior art, generating this evidence may be tedious and expensive. The present solution may automatically export the results of the monitoring, which may include SPLUNK reports, to Sharepoint or any other long term storage solution.

Sixth, process maturity may be addressed by the present embodiments. A process has been created for implementing and maturing perimeter monitoring on any test environment. Additional features may be provided, including those discussed elsewhere herein.

In some embodiments, various dashboards (i.e., user interfaces) may be provided. The dashboards may depict or graph how much data is moving from one environment or computing component to another; which protocols are being used to move most, or even some, of the data; from where is the inbound traffic coming or originating; how much data movement is compliant, non-compliant, or unknown; what the approved exceptions are enabling; how much business data is coming into an environment from non-standard sources; and/or how much of the data traveling into an environment is software and/or infrastructure related. Other dashboards with additional, less, or alternate functionality may be used.

I. Exemplary Computer-Implemented Methods for Perimeter Monitoring

Figure 2:
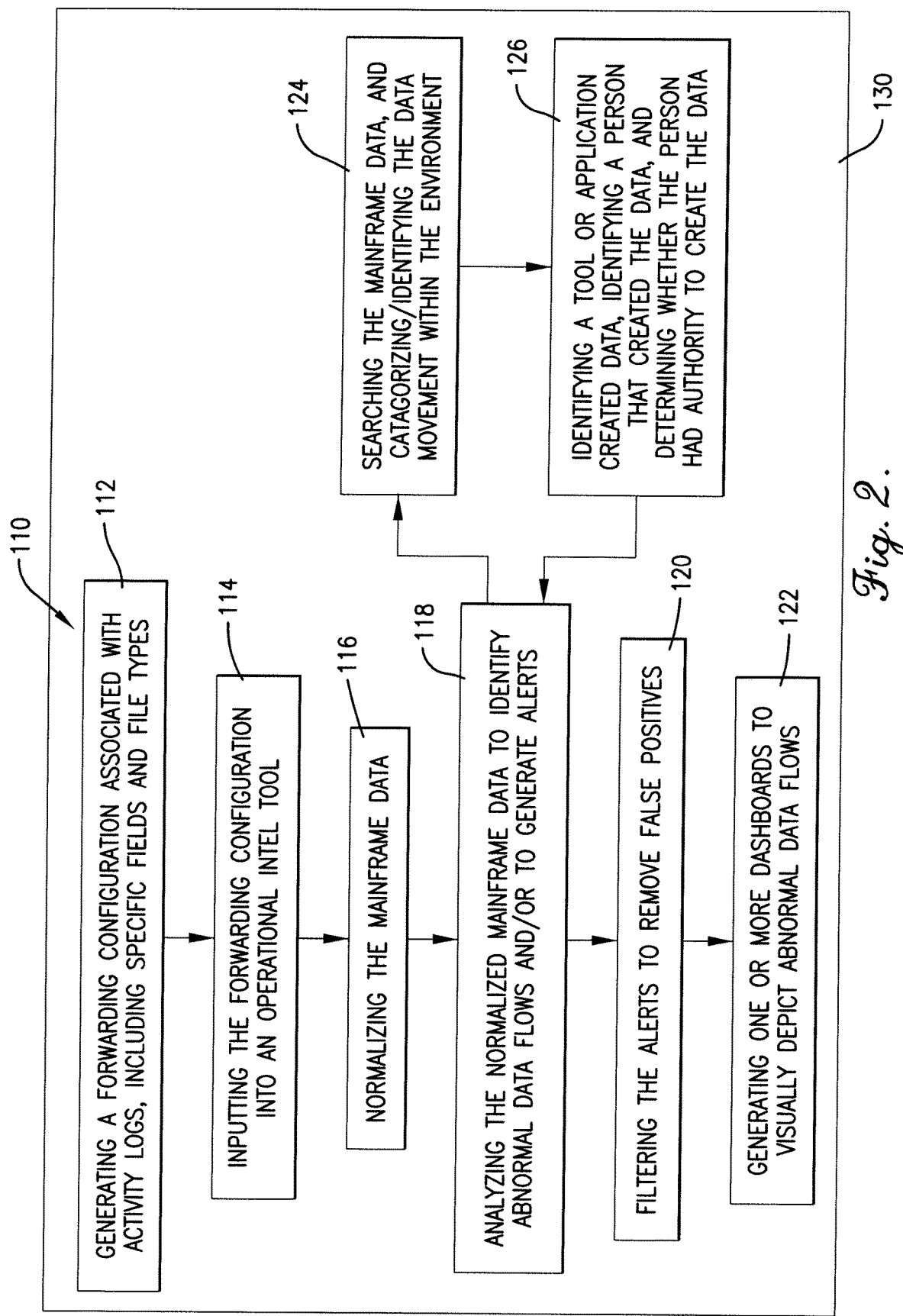
FIG. 2, is a flowchart for an embodiment of a computer-implemented method for improving the functionality of a computer for data movement perimeter monitoring.

In one aspect, a computer-implemented method of perimeter monitoring may be provided. Referring to FIG. 2, the method 110 may include: (1) generating, via one or more processors, a forwarding configuration associated with activity logs (such as activity logs associated with a test environment), the forwarding configuration including specific fields and file types (and/or contents thereof or data therein) that facilitate, or are necessary for, perimeter monitoring (or otherwise determining which activity log data elements are needed by the "operational intel tool" to reduce, or even substantially reduce, the amount of data input or analyzed by the operational intel tool and thus, to reduce its processing load), as shown in 112; (2) inputting, via the one or more processors, the forwarding configuration (including the specific fields and file types, or data therein, from the activity logs) into an "operational intel tool", as shown in 114; (3) normalizing, via the one or more processors, the mainframe data, the normalization may include assigning meaning to the information in the activity logs, creating specific groupings or classifications of data, and/or creation of new data that is easier to translate and correlate, as shown in 116; and/or (4) analyzing, via the one or more processors, the normalized mainframe data to identify abnormal data flows and/or to generate electronic alerts to facilitate perimeter monitoring, as shown in 118.

The method may include filtering, via the one or more processors, the electronic alerts to filter out or remove false positives, as shown in 120. Filtering, via the one or more processors, the electronic alerts to filter out or remove false positives may include analyzing, via the one or more processors, who (which person or which computer) sent or generated the data; what type of data was sent or communicated; what authorization the sender had; a time when the data was sent; what program or type of program sent the data; what was the source environment or originating environment of the data sent; and/or what was the destination environment or receiving environment of the data sent.

The method may include generating, via the one or more processors, one or more dashboards using the normalized mainframe data to visually depict abnormalities and/or identify abnormal data flow(s), as shown in 122. The method may include generating, via the one or more processors, one or more dashboards using the normalized mainframe data to visually depict data source(s) and data destination(s), or data flow within a computing environment. The method may include generating, via the one or more processors, one or more reports detailing the frequency and/or results of the perimeter monitoring to facilitate meeting compliance requirements and automated memorialization.

Normalizing the mainframe data may include recreating a data log with a standardized name. Normalizing the mainframe data may include classifying the type of data or files. Normalizing the mainframe data may include normalizing values within data files or within the data. Additionally or alternatively, normalizing the mainframe data may include creating a new set of data, such as by adding a new field that includes a time-stamp of when data was normalized.

The method may include searching, via the one or more processors, the mainframe data; and categorizing and/or identifying, via the one or more processors, the data movement within the computing environment, as shown in 124. The method may include identifying, via the one or more processors, when data arriving at a production environment originated from a test environment, or vice versa; and generating, via the one or more processors, an electronic alert indicating such.

The method may include identifying, via the one or more processors, which tool or application created data on a given day; determining, via the one or more processors, an identity of a person associated with a source computer from which the data originated; determining, via the one or more processors, whether the person had authority to use the tool or application on the given day; and/or if not, generating, via the one or more processors, an electronic alert indicating such, as shown in 126.

The method may include, when a potential problem or issue is identified, analyzing, via the one or more processors, who (which person or computer) created and sent the data; what authorizations they had at the time; what type of data was sent; a time when the data was sent or received; what program created and sent the data; what was the source environment for the data; and/or what was the destination environment to (i) identify false positives, and (ii) generate electronic alerts only for actionable items.

The method may include, for a given data flow, analyzing, via the one or more processors, the data flow to determine an amount of data flowing in each direction, and classifying the data flow as inbound or outbound based upon the ratio of data flowing in each direction (i.e., classify data flow as outbound for data flows with greater amounts of data flowing in that direction, as compared with inbound data).

In another aspect, a computer-implemented method for improving the functioning of a computer for perimeter monitoring of data movement of data may be provided. The computer-implemented method may include (1) ingesting, by an electronic processor, a mainframe event log into an operational intel tool in real-time to create raw data; (2) normalizing, by the electronic processor, the raw data, including standardizing the raw data from different computing environments, to create normalized data; (3) filtering, by the electronic processor, the normalized data to remove unwanted noise and to identify a data movement anomaly; (4) determining, by the electronic processor, whether the data movement anomaly meets an exception; (5) visually communicating, by the electronic processor, identification of the data movement anomaly on an electronic display, and saving the identification of the data movement anomaly in an electronic memory; and/or (6) issuing, by the electronic processor, an electronic alert if the identified data movement anomaly does not meet the exception.

In another aspect, a computer-implemented method of perimeter monitoring may be provided. The method may include (1) retrieving, via one or more processors, specific fields and/or file types (and/or contents thereof) from activity logs or other data, the specific fields and file types being identified as facilitating, or are necessary for, perimeter monitoring (or otherwise determining which activity log data elements are needed by the "operational intel tool" to reduce, or even substantially reduce, the amount of data input or analyzed by the operational intel tool, and thus, to reduce its processing load); (2) inputting, via the one or more processors, the specific fields and/or file types from the activity logs into an "operational intel tool"; (3) normalizing, via the one or more processors, the mainframe data, the normalization may include assigning meaning to the information in the activity logs, creating specific groupings or classifications of data, and/or creation of new data that is easier to translate and correlate; and/or (4) analyzing, via the one or more processors, the normalized mainframe data to determine how data is traversing a computing environment and/or to identify potentially abnormal data flows and to generate electronic alerts to facilitate perimeter monitoring.

The foregoing methods may include filtering, via the one or more processors, the electronic alerts to filter out or remove false positives. Filtering, via the one or more processors, the electronic alerts to filter out or remove false positives may include analyzing, via the one or more processors, who (which person and/or computer) sent the data; what type of data was sent or communicated; what authorization the sender had; a time when the data was sent; what program or type of program sent the data; what was the source environment or originating environment of the data sent; and/or what was the destination environment or receiving environment of the data sent. Additionally or alternatively, filtering, via the one or more processors, the electronic alerts to filter out or remove false positives may include determining, via the one or more processors, a source computing environment and a destination computing environment for the data flow; and/or determining, via the one or more processors, whether the destination computing environment is expected or typical for the source computing environment, and if so, removing the electronic alert or flagging the electronic alert as a false positive.

The foregoing methods may include additional, fewer, or alternate actions, including those discussed elsewhere herein, and may be implemented via one or more processors and/or computer-executable instructions stored on non-transitory computer-readable medium or media.

II. Exemplary Computer Systems

In one aspect, a computer system configured for perimeter monitoring may be provided. Referring again to FIG. 2, the computer system may include one or more processors 130 configured to: (1) generate a forwarding configuration associated with activity logs (such as activity logs associated with a test environment), the forwarding configuration including specific fields and file types (and/or contents or data thereof) that facilitate or are necessary for perimeter monitoring (or otherwise determining which activity log data elements are needed by the "operational intel tool" to reduce, or even substantially reduce, the amount of data input or analyzed by the operational intel tool, and thus, to reduce its processing load), shown in 112; (2) input the forwarding configuration (including the specific fields and file types, and/or data therein, from the activity logs) into an "operational intel tool", as shown in 114; (3) normalize the mainframe data, the normalization may include assigning meaning to the information in the activity logs, creating specific groupings or classifications of data, and/or creation of new data that is easier to translate and correlate, as shown in 116; and/or (4) analyze the normalized mainframe data to identify abnormal data flows and/or to generate electronic alerts to facilitate perimeter monitoring, as shown in 118.

The one or more processors 130 may be further configured to filter the electronic alerts to filter out or remove false positives, as shown in 120. Filtering, via the one or more processors, the electronic alerts to filter out or remove false positives may include: analyzing, via the one or more processors, who (which person and/or which computer) sent the data; what type of data was sent or communicated; what authorization the sender had; a time when the data was sent; what program or type of program sent the data; what was the source environment or originating environment of the data sent; and/or what was the destination environment or receiving environment of the data sent.

The one or more processors may be further configured to generate one or more dashboards using the normalized mainframe data to visually depict abnormalities and/or identify abnormal data flow(s), as shown in 122. The one or more processors may be further configured to generate one or more dashboards using the normalized mainframe data to visually depict data source(s) and data destination(s), or data flow within a computing environment or between computing devices, such as various computers and servers. The one or more processors may be further configured to: generate one or more reports detailing the frequency and/or results of the perimeter monitoring to facilitate meeting compliance requirements and automated memorialization.

Normalizing the mainframe data may include recreating a data log with a standardized name. Normalizing the mainframe data may include classifying the type of data or files. Normalizing the mainframe data may include normalizing values within data files or within the data. Additionally or alternatively, normalizing the mainframe data may include creating a new set of data, such as by adding a new field that includes a time-stamp of when data was normalized.

The one or more processors may be configured to: search the mainframe data; and/or categorize and/or identify the data movement within the computing environment, as shown in 124. The one or more processors may be further configured to: identify when data arriving at a production environment originated from a test environment, or vice versa; and/or generate an electronic alert indicating such.

The one or more processors may be configured to: identify which tool or application created data on a given day; determine an identity of a person associated with a source computer from which the data originated; determine whether the person had authority to use the tool or application on the given day; and/or if not, generate an electronic alert indicating such, as shown in 126.

The one or more processors may be configured to: when a potential problem or issue is identified, analyze who created and sent the data; what authorizations they had at the time; what type of data was sent; a time when the data was sent or received; what program created and sent the data; what was the source environment for the data; and/or what was the destination environment to (i) identify false positives, and (ii) generate electronic alerts only for actionable items.

The one or more processors may be configured to: for a given data flow, analyze the data flow to determine an amount of data flowing in each direction, and classifying the data flow as inbound or outbound based upon the ratio of data flowing in each direction (i.e., classify data flow as outbound for data flows with greater amounts of data flowing in that direction).

In another aspect, a computer system for perimeter monitoring of data movement of data may be provided. The system may include an electronic memory element configured to store information; and an electronic processor configured to—ingest a mainframe event log into an operational intel tool in real-time to create raw data, normalize the raw data, including standardizing the raw data from different computing environments, to create normalized data, filter the normalized data to remove unwanted noise and to identify a data movement anomaly, determine whether the data movement anomaly meets an exception, visually communicate identification of the data movement anomaly on an electronic display, and saving the identification of the data movement anomaly in the electronic memory, and/or issue an electronic alert if the identified data movement anomaly does not meet the exception.

In another aspect, a computer system configured for perimeter monitoring may be provided. The computer system may include one or more processors 130 configured to: (1) retrieve specific fields and/or file types (and/or contents thereof) from activity logs or other data, the specific fields and file types being identified as facilitating, or are necessary for, perimeter monitoring (or otherwise determining which activity log data elements are needed by the "operational intel tool" to reduce, or even substantially reduce, the amount of data input or analyzed by the operational intel tool, and thus, to reduce its processing load); (2) input the specific fields and/or file types (and/or data therein) from the activity logs into an "operational intel tool"; (3) normalize the mainframe data, the normalization may include assigning meaning to the information in the activity logs, creating specific groupings or classifications of data, and/or creation new data that is easier to translate and correlate; and/or (4) analyze the normalized mainframe data to determine how data is traversing a computing environment and/or to identify potentially abnormal data flows and to generate electronic alerts to facilitate perimeter monitoring.

With the foregoing computer systems, the one or more processors may be configured to filter the electronic alerts to filter out or remove false positives. Filtering, via the one or more processors, the electronic alerts to filter out or remove false positives may include analyzing, via the one or more processors, who sent the data; what type of data was sent or communicated; what authorization the sender had; a time when the data was sent; what program or type of program sent the data; what was the source environment or originating environment of the data sent; and/or what was the destination environment or receiving environment of the data sent. Additionally or alternatively, filtering, via the one or more processors, the electronic alerts to filter out or remove false positives may include: determining, via the one or more processors, a source computing environment and a destination computing environment for the data flow; and/or determining, via the one or more processors, whether the destination computing environment is expected or typical for the source computing environment, and if so, removing the electronic alert or flagging the electronic alert as a false positive.

The foregoing computer systems may include additional, less, or alternate functionality, including that discussed elsewhere herein.

III. Exemplary Implementation Process

Figure 3:
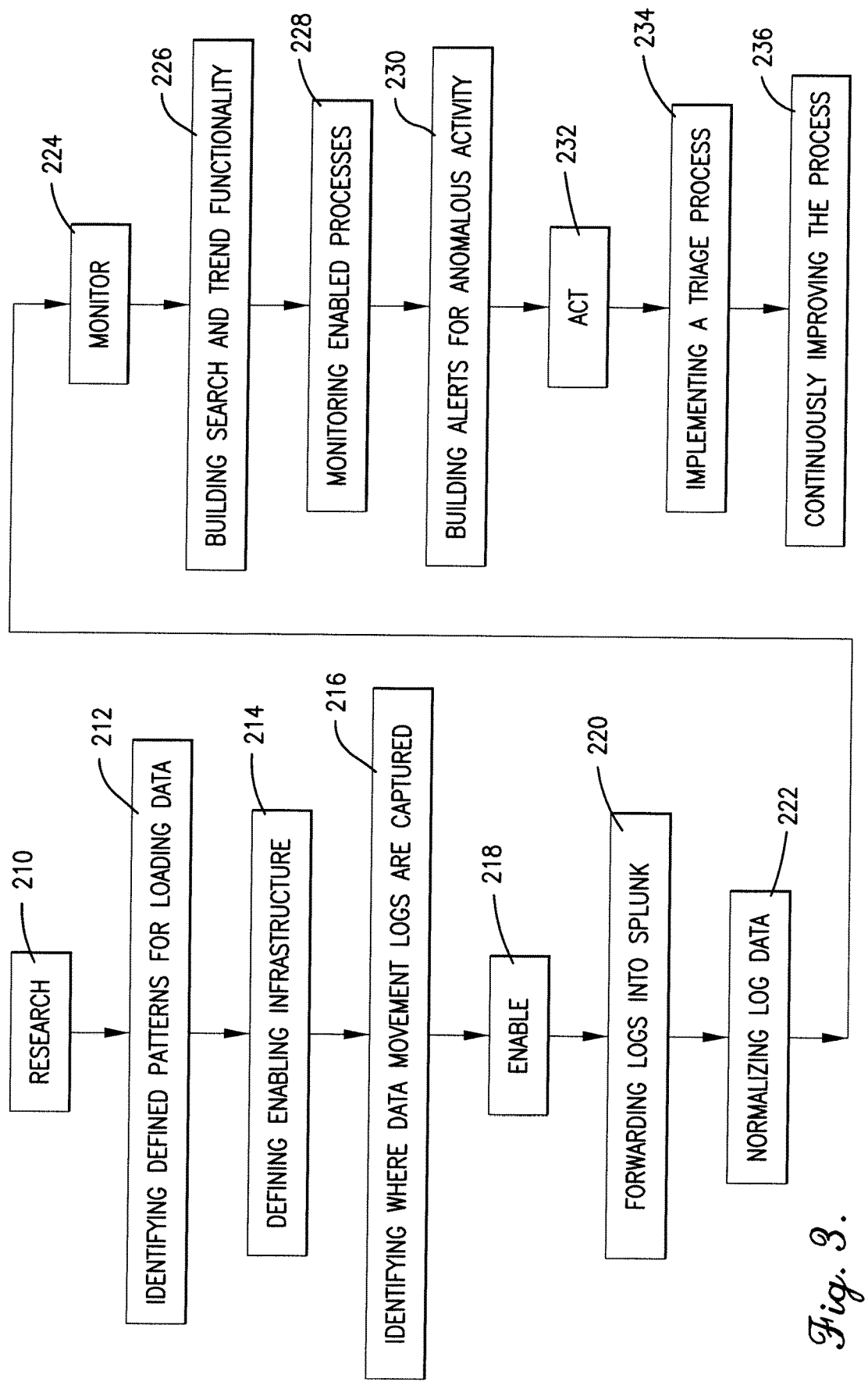
FIG. 3 is a flowchart for a process of implementing an embodiment of a computer-implemented method for improving the functionality of a computer for data movement perimeter monitoring.

Referring to FIG. 3, in an exemplary implementation, the data movement perimeter monitoring solution may be enabled in four stages: Research, Enable, Monitor, and Act. The Research stage, shown in 210, may be comprised of several substages. A first substage may involve identifying defined patterns for loading data, as shown in 212, which may include determining what data is moved, what tools move it, and what environments are involved. A second substage may involve defining the enabling infrastructure, as shown in 214, which may include determining what network components are involved (firewall, BUS, etc.), and what transport protocols and tools are used (FTP, TCP, IBM Tools, etc.). A third substage may involve identifying where data movement logs are captured (Mainframe SMF, IBUS, DataPower, MQ, Firewall, etc.), as shown in 220.

The Enable stage, shown in 222, may also be comprised of several substages. A first substage may involve forwarding logs into SPLUNK, as shown in 224. A second substage may involve normalizing log data, as shown in 226, which may include renaming fields to consistently label data for better consumption.

The Monitor stage, shown in 228, may also be comprised of several substages. A first substage may involve building search and trend functionality, as shown in 230. A second substage may involve monitoring enabled processes, as shown in 232, which may include ensuring that Ironstream is turned on, the SPLUNK forwarder is enabled, and the database connections are pulling data into SPLUNK. A third substage may involve building alerts for anomalous activity, which may include creating the alerts, and implementing rule filtering to reduce noise, as shown in 234.

The Act stage, shown in 236, may also be comprised of several substages. A first substage, shown in 238, may involve implementing a triage process, which may include analyzing results and escalating true issues. A second substage may involve continuous improvement of the process, as shown in 240, which may include updating filtering to limit noise, improving search and alert functionality, and improve the triage process.

Figure 4:
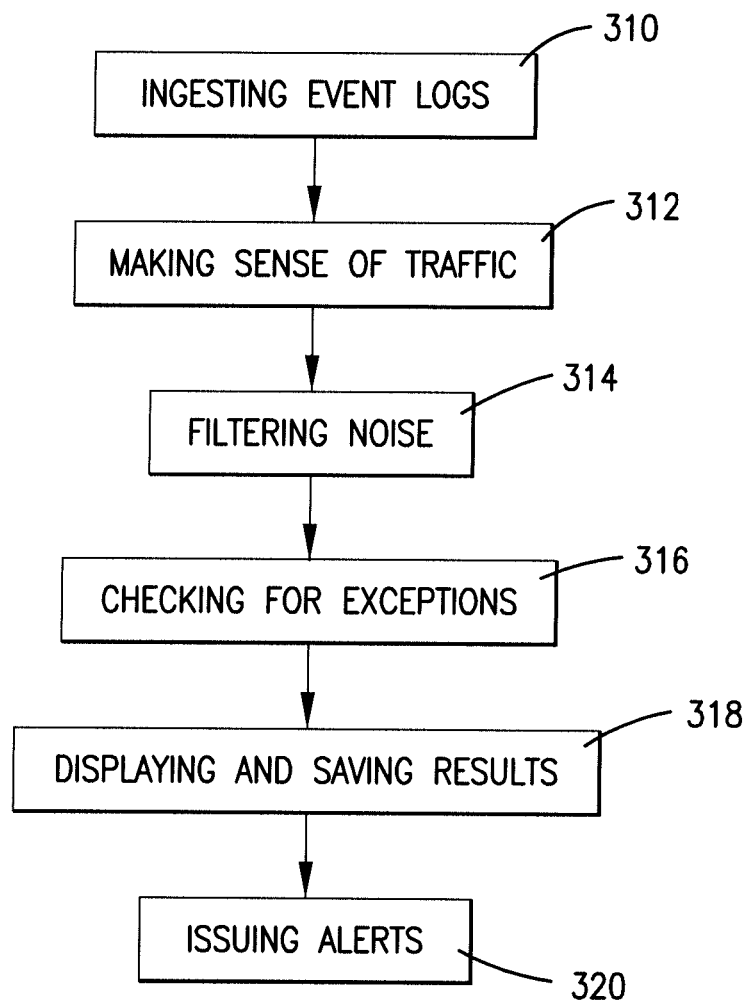
FIG. 4 is a flowchart of an embodiment of a computer-implemented method for improving the functionality of a computer for data movement perimeter monitoring.
Figure 5:
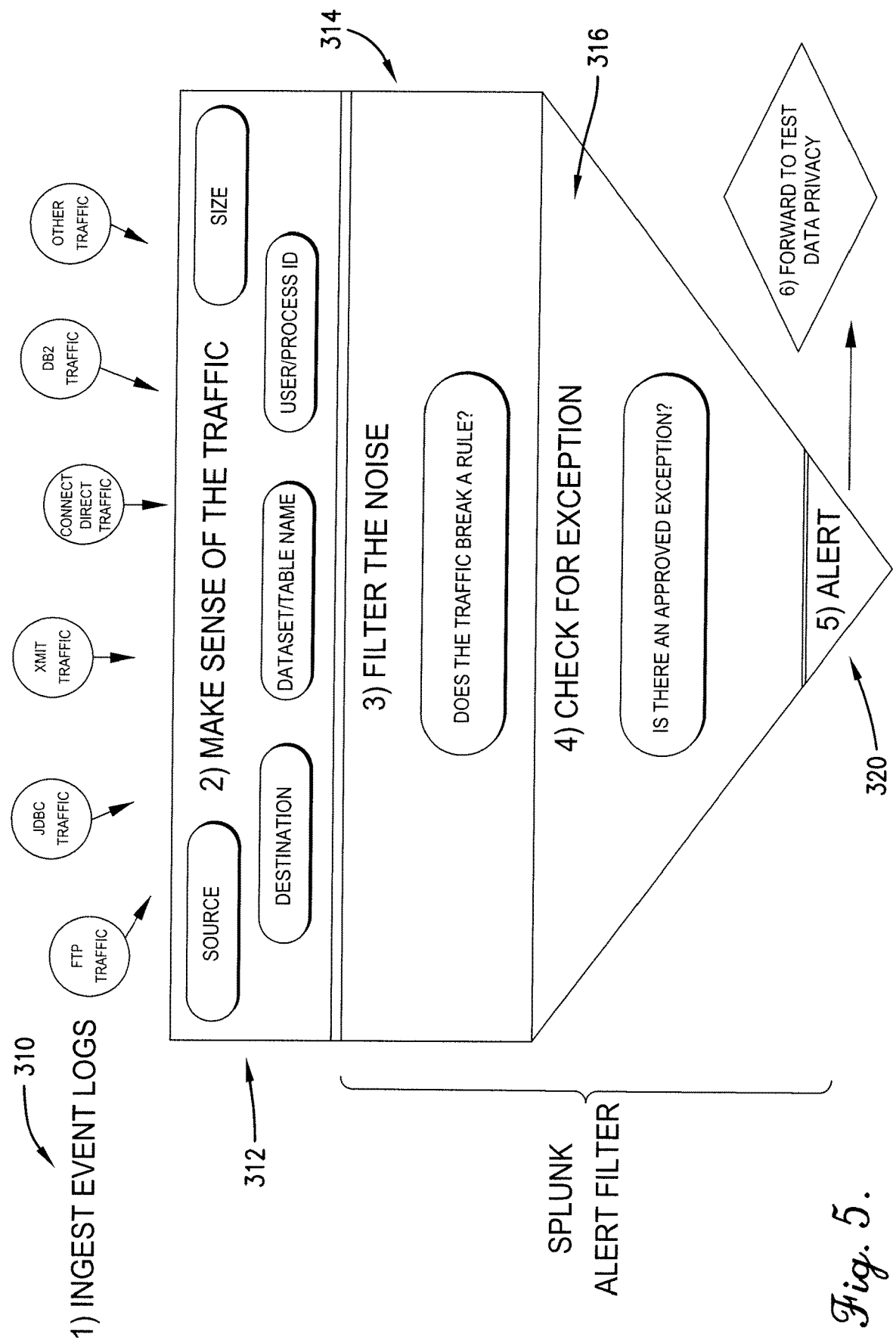
FIG. 5 is a second flowchart further depicting the embodiment of FIG. 4.

Referring also to FIGS. 4 and 5, in more detail, the overall process may involve ingesting event logs, making sense of the traffic, filtering the noise, checking for exceptions, displaying and saving results, and issuing alerts. As shown in 310, mainframe event logs are ingested into SPLUNK in real-time, which provides a better understanding of how data is moving between environments. SPLUNK a commercial operational intel tool which allows users to build apps to mine information about their own systems. Logs are operational intel. Logs are placed in a filing system, but they are seldom used because it is difficult to make sense of the filing system or the information, at least partly because they are not created for use by end-users. Further, there may be hundreds of different SMS file types, of which only a few may be needed, and of those few file types only portions of each may be needed. So several terabytes per day of data may be reduced to a few hundred gigabytes per day of less, which can save millions of dollars. Thus, embodiments determine which pieces of information in logs in a given filing system are relevant to the process of understanding data movement and performing perimeter monitoring.

As shown in 312, to make sense of the traffic, once the relevant raw data is captured in SPLUNK, the data is normalized in SPLUNK. Different environments which produce and/or move data may have many different identifiers and/or formats for that data. The same data with different names or formatted in different ways is renamed or re-formatted with standardized names or formats to facilitate subsequent use of that data. For example different environments, and different fields in different environments may document time stamps in different ways, so those time stamps may be identified and normalized so they can be used together.

Figure 6:
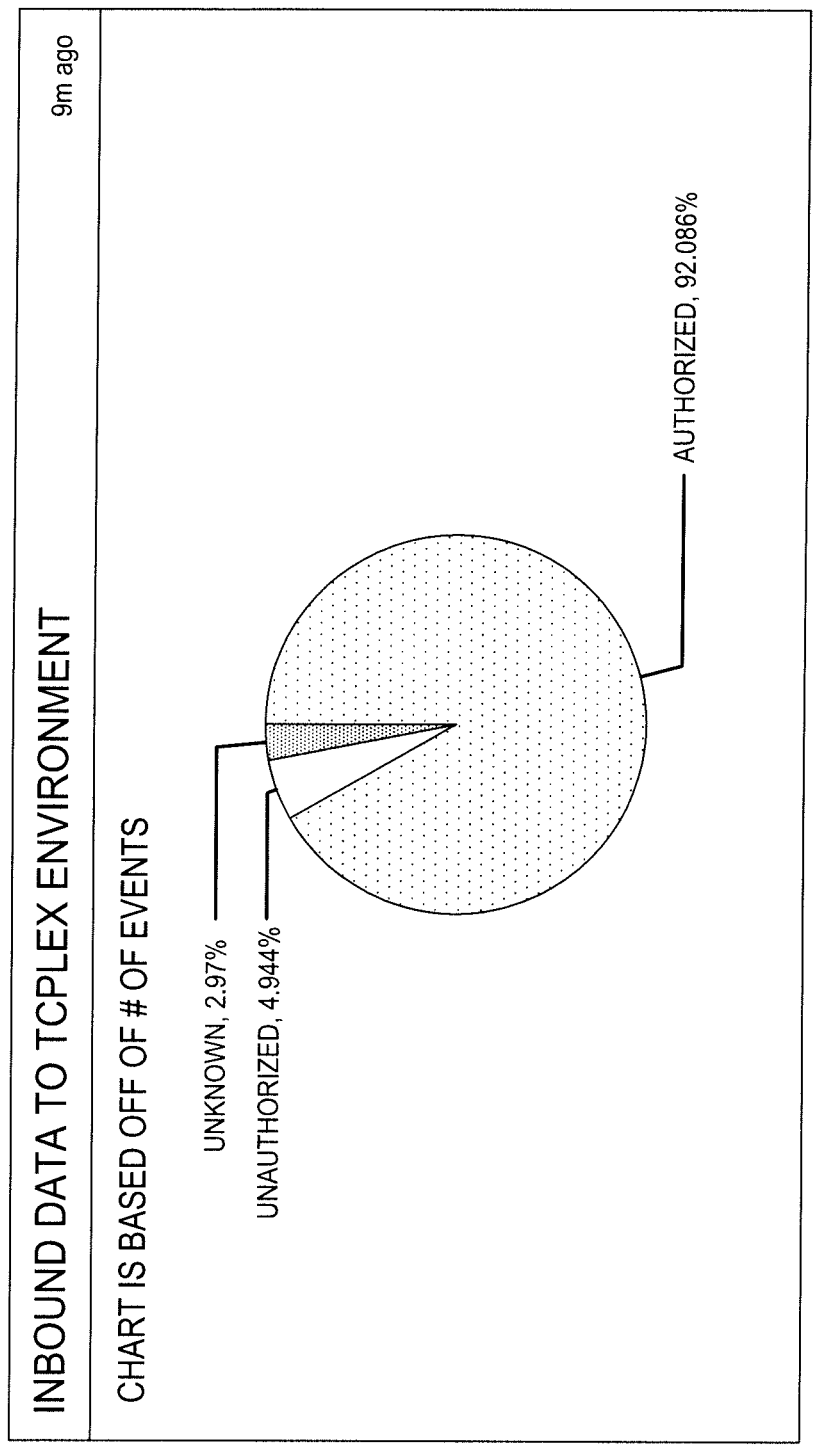
FIG. 6 is a first depiction of an exemplary dashboard content.
Figure 7:
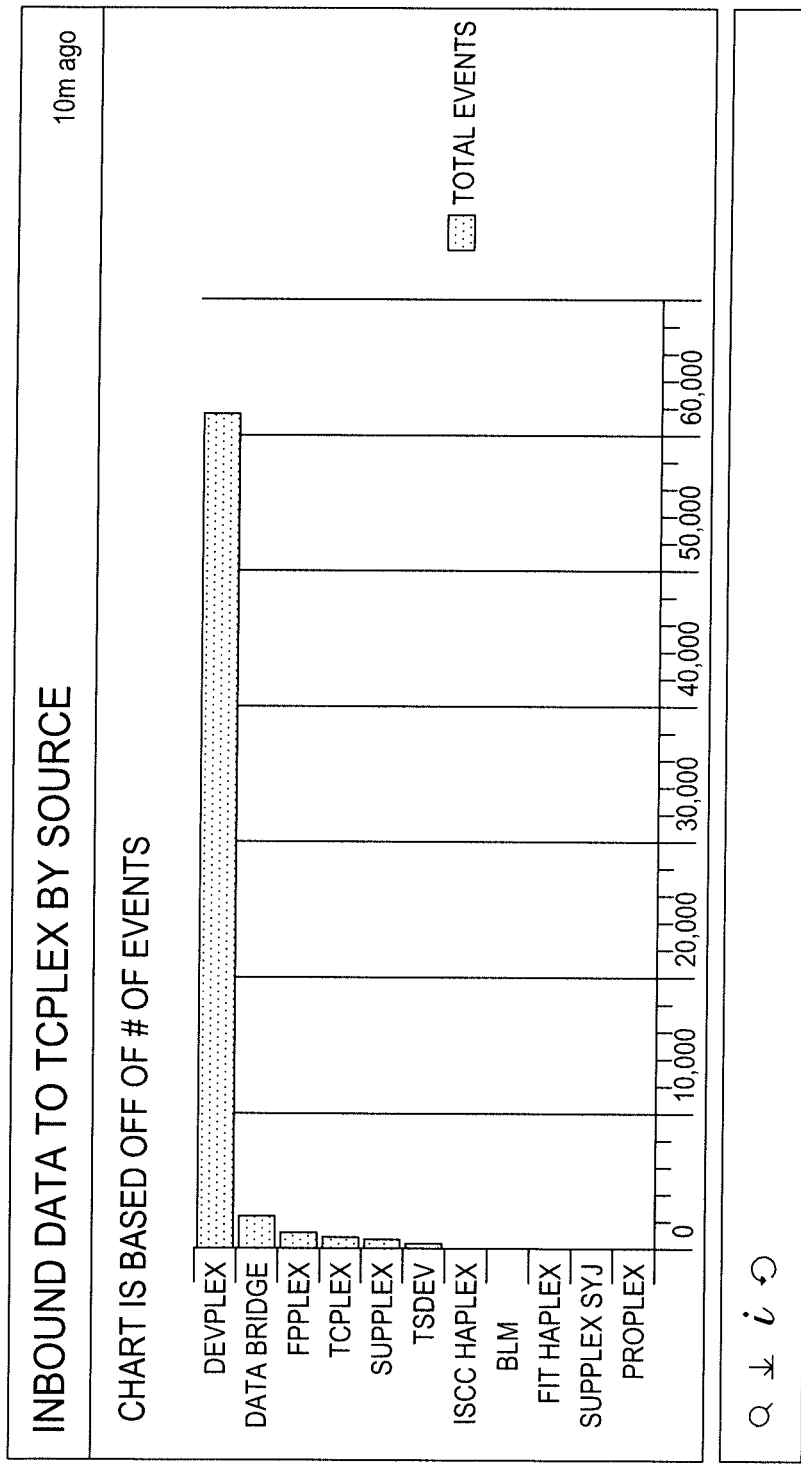
FIG. 7 is a second depiction of exemplary dashboard content.

As shown in 314, the data may be filtered, which may include creating searches to dig into the normalized data and identify and categorize data movement (e.g., from production environment to specific test environment) to identify anomalies (e.g., wrong user, environment, or other source). As shown in 316, anomalies may be filtered to identify exceptions (i.e., "false positives") and true problems, and alerts may be communicated for any true problems. Exceptions may be based on who sent data, when, what type of data, source environment, destination environment, etc., and users may be able to quickly and easily modify and/or create new exceptions as desired or needed. Exceptions may be implemented in quickly and easily modified Excel spreadsheets As shown in 318, results of the SPLUNK searches may be displayed or otherwise communicated in dashboard reports. Exemplary dashboard reports 410, 510 are shown in FIGS. 5 and 6. SPLUNK may be run to present data (in a normalized way) about how data is traversing different environments. Dashboards and charts (Pie, line) provide operational intel needed to improve monitoring, logging, and/or exceptions, and may be used to demonstrate trends so that analysts can understand data movement and to provide evidence of monitoring for auditors. The dashboards may be highly configurable to suit users' needs. The reports may include charts showing a number or percentage of authorized, unauthorized, and unknown data monitoring events; charts showing sources of inbound data; and information regarding how much data is moving from one environment to another, which protocols are being used to move most of that data, from where is the inbound traffic coming, how much data movement is compliant, non-compliant, and/or unknown, what are the approved exceptions enabling, how much business data is coming into an environment from non-standard sources, and/or how much of the data coming into an environment is software and infrastructure related. Further, the results of the SPLUNK searches may be automatically forwarded to long-term storage for memorialization to provide compelling evidence for subsequent audits.

As shown in 320, any anomalies that do not meet any exceptions may result in alerts being communicated to responsible parties and documented as evidence for subsequent audits.

IV. Additional Considerations

Some embodiments discussed herein may be related to various types of insurance policies, insurance policy data, and/or modules associated with insurance policies may be updated on a daily basis. The types of insurance policies may include auto, home, fire, life, health, renters, pet, burial, personal articles, and/or other types of insurance.

The embodiments discussed herein may be used to verify new insurance policies are correct and/or verify vehicle, home, apartment, personal articles, person, and/or customer information is correct or current. The present embodiments may also verify that vehicles, homes, personal articles, people, family members, and/or other things to be insured and/or that are presently insured actually exist.

The present embodiments may confirm various numbers and/or information, such as policy numbers, vehicle information, house information, etc. The present embodiments may also be used to verify various insurance-related transactions and/or insurance policy updates or changes are correct, such as confirming accuracy of various testing inputs, such as vehicles, drivers, owners, homes, personal articles, addresses, customer information, insurance coverages, deductibles, and limits, and/or other inputs.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for improving the functioning of a computer for perimeter monitoring of data movement of data, the computer-implemented method comprising:
    generating, by an electronic processor, a forwarding configuration associated with a mainframe event log, the forwarding configuration including specific data fields and file types that facilitate the perimeter monitoring of data movement;
    ingesting, by the electronic processor, the specific data fields and file types into an operational intel tool in real-time to create raw data;
    normalizing, by the electronic processor, the raw data, including standardizing the raw data from different computing environments, to create normalized data;
    filtering, by the electronic processor, the normalized data to remove unwanted noise based on a rule;
    identifying a data movement anomaly in the filtered normalized data;
    performing, by the electronic processor, sub-determinations for the identified data movement anomaly, the sub-determinations comprising:
        identifying the data environment of the data,
        identifying a tool or application associated with creating the data, and
        identifying a source of the data,
    determining, by the electronic processor, whether the identified data movement anomaly meets an exception associated with the sub-determinations, the exception being an allowable condition for non-compliance to the rule;
    visually communicating, by the electronic processor, identification of the data movement anomaly on an electronic display, and saving the identification of the data movement anomaly in an electronic memory; and
    issuing, by the electronic processor, an electronic alert if the identified data movement anomaly does not meet the exception.

2. The computer-implemented method of claim 1, the method comprising reducing the amount of data contained in the mainframe event log by identifying and retaining first data which is relevant to the perimeter monitoring of data movement, and identifying and discarding second data which is not relevant to the perimeter monitoring of data movement.

3. The computer-implemented method as set forth in claim 1, wherein normalizing the raw data to create the normalized data includes standardizing different files names and different file formats from different computing environments.

4. The computer-implemented method of claim 1, wherein normalizing the raw data to create the normalized data includes standardizing data values provided by different computing environments.

5. The computer-implemented method as set forth in claim 1, wherein filtering the normalized data includes searching the normalized data to identify and categorize data movement in order to identify the data movement anomaly.

6. The computer-implemented method as set forth in claim 1, wherein the data movement anomaly is identified based on one or more of a source of the data, a destination of the data, a type of the data, an authorization of the source of the data, a time when the data was sent, and a program that sent the data.

7. The computer-implemented method as set forth in claim 1, wherein the exception is based on one or more of a source of the data, a destination of the data, a type of the data, an authorization of the source of the data, a time when the data was sent, and a program that sent the data.

8. The computer-implemented method as set forth in claim 1, wherein the identification of the data movement anomaly is visually communicated in the form of a dashboard report.

9. The computer-implemented method as set forth in claim 7, wherein the dashboard report includes one or more of a source of the data, a destination of the data, a type of the data, an authorization of the source of the data, a time when the data was sent, and a program that sent the data.

10. The computer-implemented method as set forth in claim 1, wherein the identification of the data movement anomaly is visually communicated in the form of a chart.

11. The computer-implemented method as set forth in claim 9, wherein the chart includes one or more of a source of the data, a destination of the data, a type of the data, an authorization of the source of the data, a time when the data was sent, and a program that sent the data.

12. The computer-implemented method as set forth in claim 1, further including saving the electronic alert in the electronic memory.

13. A computer-implemented method for improving the functioning of a computer for perimeter monitoring of data movement of data, the computer-implemented method comprising:
    generating, by an electronic processor, a forwarding configuration associated with a mainframe event log, the forwarding configuration including specific data fields and file types that facilitate the perimeter monitoring of data movement;
    ingesting, by the electronic processor, the specific data fields and files types the into an operational intel tool in real-time to create raw data;
    normalizing, by the electronic processor, the raw data, including standardizing different files names, different file formats, and data values from different computing environments, to create normalized data;

filtering, by the electronic processor, the normalized data to remove unwanted noise based on a rule to identify and categorize data movement in the normalized data;
identifying a data movement anomaly in the filtered normalized data;
performing, by the electronic processor, sub-determinations for the identified data movement anomaly, the sub-determinations comprising:
identifying the data environment of the data,
identifying a tool or application associated with creating the data, and
identifying a source of the data,
determining, by the electronic processor, whether the identified data movement anomaly meets an exception associated with the sub-determinations, the exception being an allowable condition for non-compliance to the rule;
visually communicating, by the electronic processor, identification of the data movement anomaly on an electronic display in the form of a dashboard report, and saving the identification of the data movement anomaly in an electronic memory; and
issuing, by the electronic processor, an electronic alert if the identified data movement anomaly does not meet the exception, and saving the electronic alert in the electronic memory.

14. A system for perimeter monitoring of data movement of data, the system comprising:
an electronic memory element configured to store information; and an electronic processor configured to—
generate a forwarding configuration associated with a mainframe event log, the forwarding configuration including specific data fields and file types that facilitate the perimeter monitoring of data movement;
ingest the specific data fields and file types into an operational intel tool in real-time to create raw data,
normalize the raw data, including standardizing the raw data from different computing environments, to create normalized data,
filter the normalized data to remove unwanted noise based on a rule,
identify a data movement anomaly in the filtered normalized data,
perform sub-determinations for the identified data movement anomaly, the sub-determinations comprising:
identifying the data environment of the data,
identifying a tool or application associated with creating the data, and
identifying a source of the data,
determine whether the identified data movement anomaly meets an exception associated with the sub-determinations, the exception being an allowable condition for non-compliance to the rule,
visually communicate identification of the data movement anomaly on an electronic display, and saving the identification of the data movement anomaly in the electronic memory, and
issue an electronic alert if the identified data movement anomaly does not meet the exception.

15. The system as set forth in claim 14, wherein the electronic processor is further configured to reduce the amount of data contained in the mainframe event log by identifying and retaining first data which is relevant to the perimeter monitoring of data movement, and identifying and discarding second data which is not relevant to the perimeter monitoring of data movement.

16. The system as set forth in claim 14, wherein normalizing the raw data to create the normalized data includes standardizing different files names and different file formats from different computing environments.

17. The system as set forth in claim 14, wherein normalizing the raw data to create the normalized data includes standardizing data values provided by different computing environments.

18. The system as set forth in claim 14, wherein filtering the normalized data includes searching the normalized data to identify and categorize data movement in order to identify the data movement anomaly.

19. The system as set forth in claim 14, wherein the data movement anomaly is identified based on one or more of a source of the data, a destination of the data, a type of the data, an authorization of the source of the data, a time when the data was sent, and a program that sent the data.

20. The system as set forth in claim 14, wherein the exception is based on one or more of a source of the data, a destination of the data, a type of the data, an authorization of the source of the data, a time when the data was sent, and a program that sent the data.

* * * * *